Jan. 5, 1932.  J. A. BERGH ET AL  1,840,078

DIRECTION SIGNAL SWITCH

Filed May 5, 1930

INVENTORS:
Johan A. Bergh
Franklin W. Turner
BY David E. Carlsen
ATTORNEY.

Patented Jan. 5, 1932

1,840,078

UNITED STATES PATENT OFFICE

JOHAN A. BERGH AND FRANKLIN W. TURNER, OF NORTHFIELD, MINNESOTA

DIRECTION SIGNAL SWITCH

Application filed May 5, 1930. Serial No. 450,010.

Our invention relates to direction signals for motor cars, trailers or other vehicles having a source of electric current and a steering wheel or other mechanical equivalent thereof. The main object of the invention is to provide simple manually controlled electrically actuated signal means for motor cars particularly. The device is particularly useful on vehicles having electrically illuminable signals mounted on the right and left sides of such vehicle to indicate an intended right or left turn before and during such turn. The signal means are turned on by hand, preferably, at a point near the steering wheel and turned off automatically by subsequent movement of the steering wheel when the vehicle wheels are straightened after making a turn signaled. The device might therefore be considered as semiautomatic of action.

The device is illustrated in a preferred form and mounting in the accompanying drawings, in which,—

Figure 7:
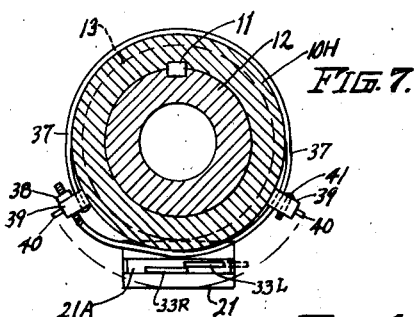
Fig. 7 is an enlarged sectional view through the steering wheel, below its spokes, about as on line 7—7 in Fig. 1 and showing more fully the mounting of our cam device relative to the switch box housing mounted on the steering column.
Figure 4:
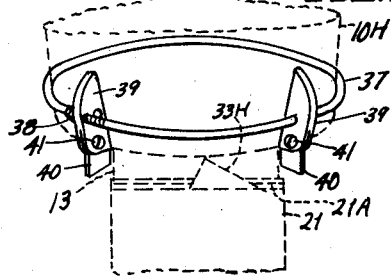
Fig. 4 is a perspective detail view, in approximately full size, of a preferred rotary cam device mounted on the hub of a steering wheel and as used for the automatic light cut-off of our device, the said hub and adjacent parts shown dotted.

Referring to the drawings by reference numerals, 10 designates the usual type of motor car steering wheel and of which 10H is the hub suitably keyed at 11 to a steering shaft 12 (see Fig. 7) rotatable within the steering column 13 below the lower end of which the steering shaft carries the usual steering arm (not shown) suitably connected to both front wheels of the vehicle.

Our device involves the use of a number of electric signals, preferably four, suitably mounted at the left and right sides of the vehicle, one pair exposed forwardly and the other pair exposed rearwardly. In other words there is one right hand light exposed forwardly of the vehicle and another right hand light exposed rearwardly. Likewise a corresponding pair of signals on the left side. In signaling, the right hand lights are illuminated simultaneously by our signal device to expose suitable signal means indicating a right turn and corresponding signals to indicate left turn.

Figures 2, 3:
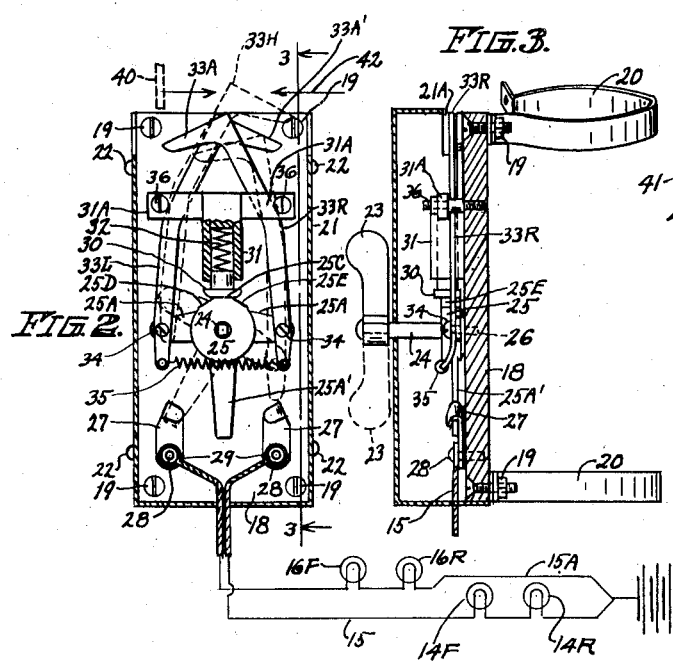
Fig. 2 is a front elevation or face view of our signal mechanism and housing taken on a plane through the cover about as on line 2—2 in Fig. 1. A wiring diagram is included.
Fig. 3 is a sectional, longitudinal elevation taken as on line 3—3 in Fig. 2 near the right hand edge of the mechanism housing.
Figures 5, 6:
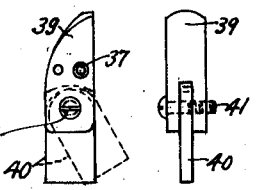
Fig. 5 is a side elevation of one of the cams of Fig. 4, in approximately full size.
Fig. 6 is a right hand edge view of Fig. 5.

In Fig. 2 the right hand front and rear signal lights are designated 14F and 14R respectively, both in a circuit 15. The corresponding left side lights are designated 16F and 16R also in circuit 15A, both circuits receiving current from a battery 17.

Figure 1:
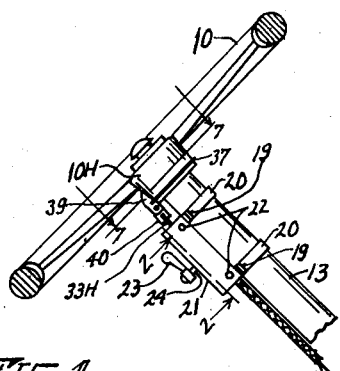
Fig. 1 is a side elevation of the upper portion of a steering wheel column of a motor vehicle, and steering wheel shown in section, and the electric switch box of our device in operative position on said column.

Our signal device comprises in part a mechanism housing of which 18 is an elongated, upright base at the top and bottom parts of which are removably fixed as at 19 a pair of metal bands 20 adapted to be clamped around the steering column to hold the signal mechanism housing securely against the upper part of the column on the side nearest the driver of the car, as in Fig. 1.

21 is a sheet metal cover removably securable to the base 18 as at 22 and inclosing all of the switch mechanism mounted on the base 18 except a manually operated signal-lever 23 exteriorly of the housing and within easy reach of the driver. This lever is fulcrumed on a stud 24 comprising an integral part of an oscillatable switch member and said stud extending forwardly as into a bore 26 in the base 18 (see Fig. 3) serving as a bearing. Said switch member has its hub part concentric of and integral with stud 24 and designated as 25 in Figs. 2 and 3, said member having two normally horizontal arms 25A and a downward arm 25A' in neutral position when vertical. Oscillation of the member 25 causes its arm 25A' to be swung into circuit closing contact with either of two contacts 27 spaced apart horizontally and fixed as with screws 28 to the base 18, said screws arranged to retain wire terminals 29 of the circuit wires 15—15A. Obviously when the switch lever 23 is moved to cause arm 25A' to contact with member 27, to the left in Fig. 2 (shown dotted in contact position) circuit will be closed from battery 17 through wire 15A contact 27, arm 25A' and grounded through base 18, the lights 16F and 16R and illuminating these direction signals on the left side of the car. Opposite movement of the lever causes lighting of lights 14F and 14R simultaneously, to indicate intended right hand turn of the car.

After causing the desired signals to light as described it is of course necessary to turn them off after the turn has been made and for this purpose we provide certain mechanical means operating automatically, and now to be described:

Referring particularly to Fig. 2, and assuming that switch member 25 is in the inoperative position shown in full line, the hub is formed exteriorly and above the fulcrum with three tangent faces, one horizontal as 25C and two adjoining angular faces 25D and 25E. 30 is a downwardly actuated plug, reciprocable in a vertical bore of a vertical boss 31 on base 18 and yieldably impelled downwardly by a coil spring 32. The lower end of the plug 30 has a flat face bearing against one of the hub faces 25C, 25D, 25E at all times and holding the circuit closing member rigid in either of its three positions. The arms 25A of the pivot or plug 25 are normally horizontal while arm 25A' is vertical and in non-circuit closing position. When said arm 25A' is swung to the right to engage with the right hand circuit contact 27 (see Fig. 2) the plug 30 yields upwardly and then bears down on the angular face 25E of the oscillatable hub 25; likewise when swung to the left said plug will bear down on the face 25D.

33R and 33L are a pair of upright inverted L-shape actuators, both fulcrumed at 34, near their lower ends, one on each arm 25A near its outer ends, the lower ends of said actuators being connected by a tension coil spring 35 to hold said actuators with their upper parts being outwardly and slidably against a pair of horizontally spaced pins 36 retained in a horizontal arm 31A forming an integral part of boss 31 and said arm spaced outwardly from the base 18, the actuators being slidable freely between said arms and the base 18.

When the hub 25 is in non-active position, indicated in Fig. 2 in full lines, the actuators are about flush with the upper end of housing 21 and within an opening 21A provided in said end of the housing, the toe (upper) ends of said actuators being then directed to right and left and downwardly, said end parts being designated 33A for the right hand member and 33A' for the left hand member. The shanks of the members 33R and 33L are bent or curved inwardly intermediate their ends, giving a cam effect against pins 36 and causing a more pronounced downward angular position to parts 33A and 33A'. The function of these actuators is to present an upwardly pointing inverted V-shape heel part above the casing when either actuator is raised by oscillation of hub 25 when signaling. For example, if the driver is to signal a left turn the actuator 33L is projected upwardly presenting the inverted V-shaped heel 33H (Fig. 2) above the casing, electric signal means previously described meanwhile closing circuit to the signals 16F and 16R.

We provide further, in our device, certain adjustable cam means, preferably fixed on the steering wheel hub 10H and so arranged as to contact with the protruding heel 33H when the steering wheel is turned. Said means in a preferred form comprises a wire loop 37 adapted to be clamped at 38, adjustably, to the hub (Fig. 7), said ring carrying a pair of metal lugs 39, each slitted or bifurcated in its lower part to receive a preferably fiber clip 40 on a screw 41 which clamps the clip in position in the lug and protruding downwardly therefrom. These clips and lugs are of course held securely in position by the ring 37 at predetermined distances apart and their clips so arranged as to move in an arcuate path directly over the top end of casing 21 and its slit 21A.

Obviously when the steering wheel is turned to the left these clips travel to the right and engage the protruding (heel) end of an actuator springing the heel 33H of member 33A to the right with no effect except to rock the member to the right. Then when the steering wheel is returned to normal, making the clips contact with said heel while traveling to the left (see arrow 42 Fig. 2), said heel is frictionally engaged and the entire member 33L is forced down and the switch hub 25 oscillated back to original non-signal position.

For right hand signaling the operation is the same except that actuator 33R is raised with its heel into the path of the clips 41, the right hand electric signals 14F and 14R being first illuminated by required movement of lever 23.

It will now be understood that the initial signal action is manual, whether for right or left turn, and the circuit opening means might be called semi-automatic as they restore the switch means to neutral by means of the clips mounted on the wheel hub which act on the exposed heel 33H of either switch actuator bar.

We do not wish to be limited to the particular construction of initial circuit opening means above described and illustrated in Figs. 4, 5, 6 and 7. Any other mechanical equivalent of these parts and acting on the parts 33H as described, may be used. Other modifications of structure such as the mounting means for the switch box, etc., may be embodied without departing from the scope and spirit of the invention.

We claim:

1. In a direction signal of the class described, the combination with the steering column of a motor vehicle and its rotatable steering wheel, of an elongated switch box mounted on said column in proximity to said wheel, a switch mounted in said box and manually operated for selective control of electrically illuminable direction signals, said box provided with a pair of fixed contacts, in circuit, and in horizontally spaced relation; a T-shaped oscillatable circuit closing switch member with its leg normally between said fixed contacts, a pair of upright elongated actuators fulcrumed one on each of the arms of said T-shaped member, and extending upwardly therefrom, the upper ends of said actuators formed each with an inverted V-shaped heel, said T-member adapted to be oscillated to cause the leg thereof to frictionally engage a circuit closing contact and simultaneously move one of said actuators upwardly and toward the opposite side of the switch box to project the heel part thereof above the upper end of the switch box, and means fixed on the steering wheel adapted to engage said protruding heel part, to push the actuator back to original position and simultaneously move the leg of the T-member to circuit-opening position when the steering wheel is turned in a predetermined direction.

2. The structure specified in claim 1 and guide means loosely and guidably retaining said actuators in the upper part of the switch box, each actuator extending upwardly vertically thence inward angularly to the top end, a tension coil spring connecting the lower ends of said actuators to normally spread their upper parts outwardly, guide pins in the casing for said actuators to bear against slidably and cause inward movement of each actuator when it is projected upwardly, said spring adapted to yield and allow an upwardly projected actuator to be moved freely in one direction and inoperatively with relation to the T-member, and a yieldable friction device mounted to frictionally and continuously engage the hub of the T-member for the purpose described.

In testimony whereof we affix our signatures.

JOHAN A. BERGH.
FRANKLIN W. TURNER.